Oct. 23, 1923.　　　　　　　　　　　　　　　1,471,323
A. BADOWSKI
PRESSURE GAUGE FOR PNEUMATIC TIRES
Filed July 23, 1921

Alfred Badowski
Inventor.
By N. T. Lord
Attorney.

Patented Oct. 23, 1923.

1,471,323

UNITED STATES PATENT OFFICE.

ALFRED BADOWSKI, OF CHARLESTON, WEST VIRGINIA.

PRESSURE GAUGE FOR PNEUMATIC TIRES.

Application filed July 23, 1921. Serial No. 487,145.

*To all whom it may concern:*

Be it known that I, ALFRED BADOWSKI, a citizen of the United States, residing at Charleston, in the county of Kanawha and State of West Virginia, have invented new and useful Improvements in Pressure Gauges for Pneumatic Tires, of which the following is a specification.

Pressure gauges for pneumatic tires comprise a stem which is necessarily of a reduced diameter due to the fact that it must extend through an opening in the felloe. The pressure gauge of the present invention involves a hollow stem which is connected with the tire tube and in which is arranged a valve carrying plunger, this plunger being subjected to the tube pressure and indicates by its position the tube pressure. Devices of this kind have heretofore been made. The present invention is directed primarily to the manner of securing the spring resisting the movement of the plunger to the plunger. This is of importance due to the confined space in which the spring must be arranged as a larger spring is desirable and also through the necessity for making the connection secure and at the same time without too great expense.

The invention is illustrated in the accompanying drawings as follows:—

Figure 1:
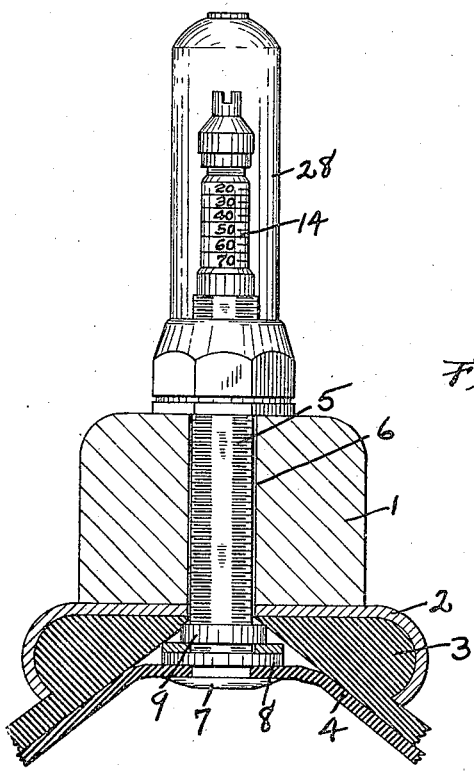

Fig. 1 shows a central section through the wheel felloe with the pressure gauge in place.

Figure 2:
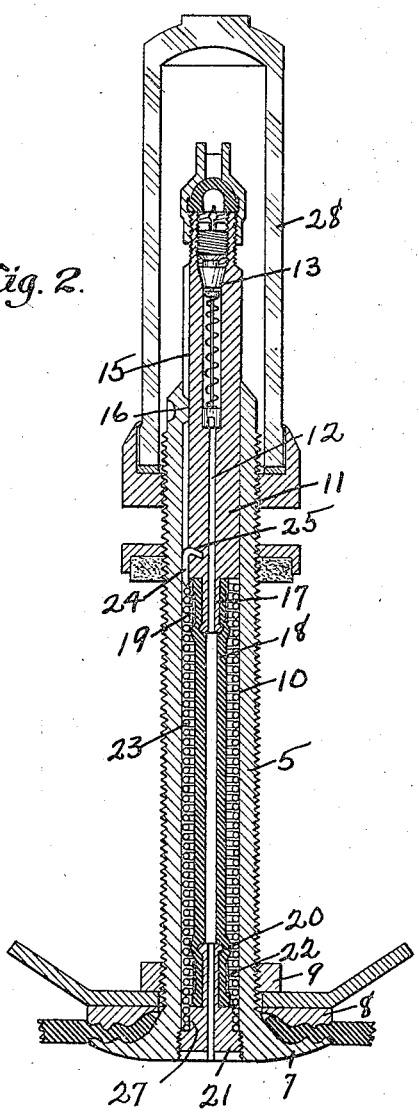

Fig. 2 a central section through the pressure gauge.

Figure 3:
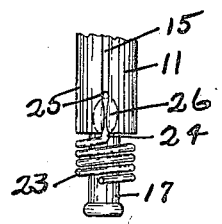

Fig. 3 an enlarged view of the end of the plunger showing the means of securing the spring.

1 marks the felloe, 2 the rim, 3 a tire, 4 an inner tube, 5 a valve stem extending through an opening 6 in the felloe, 7 a head on the valve stem, 8 a washer clamping the tube against the head 7, and 9 a nut on the stem exerting pressure on the washer.

The stem has an opening 10 extending through it and the plunger 11 is movably mounted in this opening. This plunger has an axial opening 12 extending through it in which is arranged the valve 13. The plunger has a scale 14 indicating the pounds to which it is subjected and also is provided with a key-way 15 in which a key 16 on the stem operates preventing the turning of the plunger as the pump is attached.

The plunger has a nipple 17 on which is secured a rubber tube 18 by means of a wire or thread winding 19. The inner end of the rubber tube is secured on a nipple 20 extending from a plug 21 screwed into the inner end of the stem. The rubber is bound on the nipple by the twine or wire 22.

A spring 23 has an axially extending hooked end 24, the hook of which extends into an opening 25. The axially extending portion of the extension 24 is preferably arranged in a key-way 15 and is locked in position by merely heading down the walls of the key-way at 26 as clearly shown in Fig. 3. The inner end of the spring is secured on a screw thread 27 on the plunger 21.

A transparent cap 28 is provided covering the outer end of the stem through which the scale may be observed.

What I claim as new is:—

1. In a pressure gauge for pneumatic tires, the combination with a tire stem of a valve carrying plunger in the stem connected with and subjected to tire pressure, said plunger having a radially extending hook receiving opening therein; and a coil spring within the stem resisting the movement of the plunger, said spring having an axially extending hooked end extending into the hook receiving opening in the plunger.

2. In a pressure gauge for pneumatic tires, the combination with a tire stem of a valve carrying plunger connected with and subjected to the tire pressure and movable in response to said pressure, said plunger having an axially extending groove from which leads a radially extending hook receiving opening; and a coil spring within the stem resisting the movement of the plunger, said spring having an axially extending hooked end hooked into said hook receiving opening, the axially extending portion of the spring extending along the groove to the opening.

3. In a pressure gauge for pneumatic tires, the combination with a tire stem of a valve carrying plunger connected with and subjected to the tire pressure and movable in response to said pressure, said plunger having an axially extending groove from which leads a radially extending hook receiving opening; and a coil spring within the stem resisting the movement of the plunger, said spring having an axially extending hooked end hooked into said hook receiving opening, the axially extending portion of the spring extending along the groove to the opening and secured in the groove by overlying portions of the walls of the groove.

4. In a pressure gauge for pneumatic tires, the combination with a tire stem having a key therein of a valve carrying plunger in the stem connected with and subjected to tire pressure and movable in response to said pressure, said plunger having an axially extending key-way cooperating with the key in the stem and a hook receiving radially extending opening leading from the key way; and a coil spring within the stem resisting the movement of the plunger, said spring having an axially extending hooked end hooked into said hook receiving opening, the axially extending portion of the stem extending along the key-way to the opening.

In testimony whereof I have hereunto set my hand.

ALFRED BADOWSKI.